United States Patent [19]

Bruck et al.

[11] Patent Number: 5,280,607
[45] Date of Patent: Jan. 18, 1994

[54] METHOD AND APPARATUS FOR TOLERATING FAULTS IN MESH ARCHITECTURES

[75] Inventors: Jehoshua Bruck, Palo Alto; Robert E. Cypher, Los Gatos; Ching-Thien Ho, San Jose, all of Calif.

[73] Assignee: International Business Machines Corporation, Armonk, N.Y.

[21] Appl. No.: 723,287

[22] Filed: Jun. 28, 1991

[51] Int. Cl.$^5$ .............................. G06F 11/00
[52] U.S. Cl. ................... 395/575; 371/11.1
[58] Field of Search .............. 395/595, 575, 800, 900; 371/11.1, 11.3, 11.0; 364/227.4, 229.4

[56] References Cited

U.S. PATENT DOCUMENTS

| | | | |
|---|---|---|---|
| 4,047,163 | 9/1977 | Choate et al. | 365/96 |
| 4,051,354 | 9/1977 | Choate | 371/10.3 |
| 4,295,218 | 10/1981 | Tanner | 371/40 |
| 4,302,819 | 11/1981 | Ware | 364/737 |
| 4,466,064 | 8/1984 | Martin | 364/200 |
| 4,507,726 | 3/1985 | Grinberg et al. | 395/800 |
| 4,605,928 | 8/1986 | Georgiou | 340/825.94 |
| 4,698,807 | 10/1987 | Marwood et al. | 371/11 |
| 4,722,084 | 1/1988 | Morton | 371/9.1 |
| 4,783,782 | 11/1988 | Morton | 371/11.3 |
| 4,791,603 | 12/1988 | Henry | 395/800 |
| 4,833,635 | 5/1989 | McCanny et al. | 364/728.01 |
| 4,868,818 | 9/1989 | Madan et al. | 371/11.3 |
| 4,875,207 | 10/1989 | Van Twist et al. | 364/900 |
| 4,891,810 | 1/1990 | Corlieu | 371/11.3 |
| 4,907,232 | 3/1990 | Harper et al. | 371/11.3 |
| 4,918,662 | 4/1990 | Kondo | 365/210 |
| 4,922,408 | 5/1990 | Davis et al. | 395/200 |
| 4,951,220 | 8/1990 | Ramacher et al. | 364/488 |
| 4,970,724 | 11/1990 | Yung | 371/9.1 |
| 5,020,059 | 5/1991 | Gorin et al. | 371/11.3 |
| 5,038,386 | 8/1991 | Li | 364/900 |
| 5,088,091 | 2/1992 | Schroeder et al. | 370/94.3 |
| 5,103,220 | 4/1992 | Brünle | 371/11.1 |
| 5,133,073 | 7/1992 | Jackson et al. | 395/800 |
| 5,134,690 | 7/1992 | Samatham | 395/200 |
| 5,173,689 | 12/1992 | Kusano | 371/11.1 |

OTHER PUBLICATIONS

Banerjee et al, "Algorithm-Based Fault Tolerance on a Hypercube Multiprocessor", vol. 39 No. 9 Sep. 1990, IEEE Transactions on Computers, pp. 1132-1145.

Kenneth Mason Publications Ltd. "Diagonal Replacement Scheme To Recover Fault In a Mesh" Research Disclosure No. 309, Jan. 1990.

Dutt et al, "On Designing and Reconfiguring K-Fault-Tokrant Tree Architectures", IEEE Trans. on Computers, vol. 39, No. 4 1990 pp. 490-503.

(List continued on next page.)

*Primary Examiner*—Robert W. Beausoliel, Jr.
*Assistant Examiner*—Joseph E. Palys
*Attorney, Agent, or Firm*—Joseph J. Kaliko; Philip E. Blair

[57] ABSTRACT

A method and apparatus are presented for tolerating up to k faults in d-dimensional mesh architectures based on the approach of adding spare components (nodes) and extra links (edges) to a given target mesh where exactly k spare nodes are added and the number of links per node (degree of the mesh) is kept to a minimum. The resulting architecture can be reconfigured, without the use of switches, as an operable target mesh in the presence of up to k faults. According to one aspect of the invention, given a d-dimensional mesh architecture M having $N = n_1 \times n_2 \times \ldots \times n_d$ nodes, the fault tolerant mesh can be represented by a circulant graph having exactly $N+k$ nodes. This graph has the property that given any set of k or fewer faulty nodes, the remaining graph, after the performance of a predetermined node renaming process, is guaranteed to contain as a subgraph the graph corresponding to target mesh M so long as $d \geq 2$ and $n_d \geq 3$. The invention also relates to a method and apparatus for efficiently locating a healthy "target mesh" in the presence of up to k faulty network components, given a fault tolerant mesh constructed in accordance with the teachings set forth herein.

19 Claims, 8 Drawing Sheets

OTHER PUBLICATIONS

Dutt et al, "Design and Reconfiguration Strategies for New-Optimal K-Fault Tokrant-Tree Architectures", IEEE 1988 pp. 328-333.

M. Sami and R. Stefanelli, Reconfigurable Architectures for VLSI Processing Arrays, Proceedings of the IEEE, vol. 74, No. 5, May 1986, pp. 712-721.

S-Y Kuo and W. K. Fuchs, Efficient Spare Allocation for Reconfigurable Arrays, IEEE Design and Test, 1987, pp. 24-31.

Y. Ueoka, C. Minagawa, M. Oka and A. Ishimoto, A Defect-Tolerant Design for Full-Wafer Memory LSI, IEEE Journal of Solid-State Circuits, vol. SC-19, No. 3, Jun. 1984, pp. 319-324.

K. E. Batcher, Design of a Massively Parallel Processor, IEEE Transactions on Computers, vol. C-29, No. 9, Sep. 1980, pp. 836-840.

V. P. Roychowdhury, J. Bruck, T. Kailath, Efficient Algorithms for Reconfiguration in VLSI/WSI Arrays, IEEE Transactions on Computers, vol. 39, No. 4, Apr. 1990, pp. 480-489.

A. L. Rosenberg, The Diogenes Approach to Testable Fault-Tolerant Arrays of Processor, IEEE Transactions on Computers, vol. C-32, No. 10, Oct. 1983, pp. 902-910.

F. T. Leighton and C. E. Leiserson, Wafer-Scale Integration of Systolic Arrays, IEEE Computer Society's Tech. Committee on Math. Foundation of Computing, Issn No. 0272-5428, Nov. 3-5, 1982, pp. 297-311.

METHOD AND APPARATUS FOR TOLERATING FAULTS IN MESH ARCHITECTURES

FIELD OF THE INVENTION

The invention relates generally to a method and apparatus for tolerating faults in d-dimensional mesh architectures. More particularly, the invention relates to (1) mesh architectures which can sustain up to a preselected number of faults and still be guaranteed to contain a "healthy" mesh connected architecture, i.e., a contained mesh that can be easily identified and be operated without experiencing a degradation in the performance of the system supported by the architecture; and (2) techniques for efficiently locating the healthy mesh in the presence of faulty network components.

In more specific terms, according to one aspect of the invention, given a d-dimensional mesh architecture M having $N = n_1 \times n_2 \times \ldots \times n_d$ nodes, a fault tolerant mesh $M_k$ can be represented by a circulant graph having exactly $N+k$ nodes. The graph representation of $M_k$ has the property that given any set of k or fewer faulty nodes, the remaining graph, after the performance of a predetermined node renaming process, is guaranteed to contain as a subgraph, the graph corresponding to target mesh M, so long as $d \geq 2$ and $n_d \geq 3$.

According to a further aspect of the invention, the method for finding healthy mesh M in $M_k$, given a set of up to k faults, where $M_k$ has $N = (n_1 \times n_2 \times \ldots \times n_d) + k$ nodes, with $d \geq 2$ and $n_d \geq 3$, and M has N nodes, comprises the steps of: (a) determining which nonfaulty nodes in $M_k$ are to be considered as candidates for node 0 in the target mesh M; (b) determining which of the candidate nonfaulty nodes is to be node 0 in the target mesh; and (c) assigning an identifier to each nonfaulty node, starting with node 0, where the set of identifiers represents a row-major ordering of mesh M.

DESCRIPTION OF THE RELATED ART

The "mesh" is one of the most important and well-known parallel architectures used in designing parallel computers and element arrays (for example, parallel memory arrays), and for connecting computing modules on a board or chip, etc.

In particular, a number of parallel computers with 2-dimensional and 3-dimensional mesh topologies presently exist or are under development. Examples include 2-dimensional mesh computers manufactured by Goodyear Aerospace (the "MPP" computer), the "MP-1" (sold by MASPAR), "VICTOR" (by IBM), and "DELTA" (by Intel). The "J-Machine", under development at MIT, is an example of a 3-dimensional mesh architecture.

One of the most important issues in the design of systems capable of parallel processing, systems that include element arrays, etc., is the system's performance in the presence of faults. For example, in a parallel computer, one would like the machine to have the same, or nearly the same, functionality and performance in the presence of some predetermined number of faults.

Wafer Scale Integration (WSI) arrays provide another example of where fault tolerant design is important. It would obviously be advantageous not to have to discard a whole wafer just because one of the components in an array on the wafer is faulty. While WSI is a technology that can increase performance, it has not yet had a significant impact in the market largely because of yield problems. Hence, it is of major practical importance to develop efficient techniques (in terms of redundancy cost) t handle faults in d-dimensional mesh architectures like those used for WSI, etc.

Many prior art patents and publications are directed to teaching how to create and use fault tolerant networks for a variety of applications. Not all of the teachings involve the use of mesh architectures; many teachings will not work for other than specific types of faulty components, for example, memory components or processors, but not both; still other teachings require large numbers of spare components and/or switches, extra communication links, etc., which tend to increase network cost and degrade performance; or will not work at all if the network structure is such that it is impossible to mask the failure of a particular component included in the architecture, etc.

For example, U.S. Pat. No. 4,047,163, to Choate et al., U.S. Pat. No. 4,051,354, to Choate, and U.S. Pat. No. 4,791,603, to Henry, describe fault tolerant techniques that work only tolerant interconnection networks.

U.S. Pat. No. 4,722,084, to Morton, describes an array configuration apparatus for use with VLSI circuits in which fault tolerance is achieved through the use of parallel linear arrays connected to a shared bus. Another "bus"-oriented fault tolerance scheme is taught in U.S. Pat. No. 4,891,810, to Corlieu, which describes a reconfigurable computing device in which the nodes are connected by a bus. In general, the bus-oriented fault tolerant architectures can seriously affect system performance, particularly if the supported system is sensitive to the potential for bus contention and the cost of managing the bus.

As indicated hereinabove, many of the prior art approaches to enhancing the fault tolerance characteristics of a network involve the addition of switches. In general, these systems have the potential to cause significant processing delays. Examples of such systems are taught in PCT Patent Application No. WO 89/07298, and European Patent EP-398971, which describe fault tolerant networks which add switches. Messages are routed through a potentially large number of these switches which can introduce the undesirable "slow down" factor.

A further example of a fault tolerant network that relies on switching to achieve its objectives is taught in U.S. Pat. No. 4,922,408, to Davis et al. Here, a multiprocessor communications system that utilizes a hexagonal array to perform fault tolerant communication is described. The system has messages routed through a potentially large number of intermediate nodes which, once again, has the potential of creating significant processing delays.

Again, as indicated hereinabove, the concept of adding spare nodes to create fault tolerant architectures is also known. However, none of the known techniques take care to (1) minimize network cost by keeping the number of spare nodes added to a minimum; (2) are capable of sustaining a plurality of faults (up to a predetermined number k) in a multidimensional mesh; (3) provide fault tolerance even in the event of total node failure where communication through the node is impossible; and (4) at the same time guarantee not to increase the degree of the fault tolerant network being created (compared to the degree of the underlying network which must remain operative under specified fault conditions).

Further examples of the state of the art are set forth in the following references, all of which fail to meet the above stated criteria.

Harper et al., U.S. Pat. No. 4,907,232, and Gorin et al., U.K. Patent GB2231985, teach techniques for tolerating malicious (Byzantine) faults in parallel architectures; however, at least 3k+1 spare nodes are required to sustain k faults.

U.S. Pat. No. 4,302,819, to Ware, describes a fault tolerant monolithic multiplier which requires a larger number of spares than the number of faults tolerated and which discards an entire row of components when a fault is discovered. This system is costly in terms of spare node requirements.

U.S. Pat. No. 4,951,220, to Ramacher et al., describes a fault tolerant VLSI system which has a degree of 16 and can tolerate at most 2 worst case faults. The fault tolerance techniques taught in this reference, particularly in view of the large degree and limited number of faults tolerated, is not suitable for multidimensional mesh applications. Like Ware and Harper et al., the Ramacher et al. system is costly in terms of spare node requirements since the number of nodes required exceeds the number of faults tolerated.

U.S. Pat. No. 4,833,635, to McCanny et al., teaches a bit-slice digital processor that contains a 2-dimensional mesh which is fault tolerant; however, fault tolerance only extends to a subsystem which forms a 1-dimensional mesh and thus has limited practical application.

European Patent Application 190813 describes a processing cell for use in constructing fault tolerant arrays. The cell requires a larger number of spares than the number of faults tolerated, has a degree of 10, and can tolerate only one fault with a worst case distribution. The processing cell approach taught by this reference is clearly expensive in terms of spare node and degree requirements.

U.S. Pat. No. 4,507,726, to Grinberg et al., teaches an apparatus for providing fault tolerance within a node; U.S. Pat. No. 4,970,724, to Yung, and PCT Application WO 90/09635, teach fault tolerant networks that require routing through faulty nodes to some extent in order to achieve fault tolerance. However, none of these teachings provide fault tolerance in certain situations where a total node failure is experienced.

A recent article entitled "Diagonal Replacement Scheme to Recover Fault in a Mesh", published January, 1990, in Research Disclosure, No. 309, by Kenneth Mason Publications, Ltd., England, further exemplifies the state of the art. Here, a fault recovery scheme for a parallel processor is disclosed; however, the scheme only works for square 2-dimensional meshes and can tolerate at most two faults with worst case distribution.

To summarize the present state of the art in view of the aforementioned references and others to be cited hereinafter, there are two basic methods for tolerating faults in mesh architectures.

The first method is to functionally mask the effect of faults by simulating the mesh with the healthy part of the architecture. The hope with this approach is to obtain the same functionality with a reasonable slow down factor. This method is taught by Kaklamanis et al. in a paper entitled "Asymptotically Tight Bounds for Computing with Faulty Array Processors", published in the Proceedings of the 31st IEEE Symposium on Foundations of Computer Science, pp. 285–296, October, 1990.

While the method taught by Kaklamanis et al. is theoretically sound, the slowdown in performance makes it unattractive in practice. Furthermore, the teachings of Kaklamanis et al., like several of the other references cited hereinabove, will only work when a component can simulate several other components, such as in a parallel machine. If the nodes are comprised of components not capable of simulating multiple components, such as memory chips, the method taught by the reference will fail to provide the desired fault tolerance.

The second known approach for tolerating faults in a mesh architecture, typified by several of the aforestated references, is to add spare processors and extra links or switches to the architecture. The idea of this approach is to isolate the faults, either by ignoring some connections or by setting the switches, while maintaining a complete mesh structure with the healthy nodes. A further example of this approach is described in a paper by Kung et al., entitled "Fault-Tolerant Array Processors Using Single-Track Switches", published in IEEE Transactions on Computers, Vol. C-38, No. 4, pp. 501–514, April, 1989.

This second known approach for obtaining fault tolerance in a mesh architecture can be problematic from several points of view. For example, if a switch mechanism is used, the mechanism itself must be fault free. Furthermore, adding switches, extra links, or spare processors increases network cost and therefore must be done in the most economical manner possible. Further yet, these extra components tend to decrease the speed of the architecture, thereby degrading network performance.

Accordingly, it would be desirable to provide a method and apparatus that achieve fault tolerance in a mesh architecture and which avoid the addition of switches and extra links used by many prior art fault tolerance mechanisms.

Furthermore, it would be desirable to be able to achieve fault tolerance in a mesh architecture without significantly degrading the performance of the network or increasing its costs. In particular, to hold down minimum the degree (fan-out) of the fault tolerant network being constructed and used.

Still further, it would be desirable to sustain faults in a mesh architecture in which individual components are not able to double for or simulate other components without suffering from significant degradation of system performance.

Further yet, it would be desirable to keep the number of spare components used to construct a fault tolerant mesh to a minimum. In particular, it would be desirable not to have to add more spare components than the number of faults to be tolerated.

As will be demonstrated hereinafter, fault tolerant mesh architectures possessing all of the desired characteristics set forth hereinabove can be realized, according to one aspect of the invention, by treating mesh architectures as graphs where the nodes of the graph represent identical components (processors, memory chips, etc.), and the edges of the graph represent communication links between the nodes, e.g., physical links, radio communication links, etc.).

It should be noted that prior art exists which utilizes graph models to develop a variety of different fault tolerant architectures. However, no such art is known to be applied to mesh architectures.

In particular, Hayes, in an article entitled "A Graph Model for Fault-Tolerant Computing Systems", published in IEEE Transactions on Computers, Vol. C-25, No. 9, pp. 875-884, September, 1976, teaches the use of a fault tolerant graph with target graphs of cycles, linear arrays, and trees. An article by Wong et al. entitled "Minimum k-Hamiltonian Graphs", appearing in the Journal of Graph Theory, Vol. 8, pp. 155-165, 1984, and an article by Paoli et al., entitled "Minimum k-Hamiltonian Graphs II", also appearing in the Journal of Graph Theory, Vol. 10, pp. 79-95, 1986, relate only to cycles.

More recent publications by Dutt et al., in particular an article entitled "On Designing and Reconfiguring k Fault-tolerant Tree Architectures", appearing in the IEEE Transactions on Computers, Vol. C-29, No. 9, pp. 836-840, 1980, and an article entitled "An Automorphic Approach to the Design of Fault-tolerant Microprocessors", appearing in the Proceedings of the 19th International Symposium On Fault Tolerant Computers, pp. 496-503, June 1989, relate respectively to target graphs consisting of trees and hypercubes.

As indicated hereinabove, however, none of the aforestated references teach the use of graphs as models for fault tolerant mesh architectures containing another mesh as a target mesh in general, nor do they teach the specific techniques, to be described in detail hereinafter, for constructing and utilizing fault tolerant meshes.

SUMMARY OF THE INVENTION

Accordingly, it is an object of the invention to provide an efficient method and apparatus for defining, constructing, and using fault tolerant mesh architectures (all mesh architectures referred to generally hereinafter are meant to be considered as d-dimensional mesh architectures, where d is an integer that may be arbitrarily chosen).

It is a further object of the invention to provide fault tolerant mesh architectures that can sustain a predetermined number of faults and still each be guaranteed to contain a healthy mesh-connected architecture that can be operated without experiencing slowdown.

Furthermore, it is an object of the invention to provide fault tolerant mesh architectures that can easily be reconfigured, without the use of switches, in the presence of faults, i.e., to provide techniques which can efficiently locate the healthy mesh in a fault tolerant network in the presence of faulty network components.

Further yet, it is an object of the invention to minimize the cost of fault tolerant mesh architectures by adding exactly k spare nodes in order to tolerate up to k node faults, while at the same time keeping to a minimum the number of links per node (degree of the mesh). In particular, it is an object of the invention to provide a method and apparatus for tolerating a single-node fault which requires the addition of only one spare component and which does not increase the maximum degree of the mesh.

Still further, it is an object of the invention to provide a method and apparatus for constructing and using fault tolerant mesh architectures that can be generalized for use in parallel computers, other parallel architectures, arrays of chips on boards, WSI arrays, memory chips, etc.

According to the invention, mesh architectures are viewed as graphs where the nodes in a given graph represent identical components (processors, memory chips, etc.) and the edges of the graph represent communication links between the nodes.

In accordance with this aspect of the invention, a "target mesh" M, which can be any d-dimensional mesh with $N=n_1 \times n_2 \times \ldots n_d$ nodes where each $n_i$ specifies the length of the i-th dimension, (where $d \geq 2$ and $n_d \geq 3$), is first selected. Then, a fault tolerant mesh $M_k$, with $N+k$ nodes, is defined and constructed by using a circulant graph model where the graph has exactly $N+k$ nodes. The graph representation of $M_k$ has the property that given any set of k or fewer faulty nodes, the remaining graph, after the performance of a predetermined node renaming process, is guaranteed to contain as a subgraph, the graph corresponding to target mesh M, so long as $d \geq 2$ and $n_d \geq 3$. It should be noted that the requirement that $n_d > 3$ is equivalent to the requirement that at least one $n_i \geq 3$, as $n_i$ and $n_d$ can be swapped without changing the target graph.

It should be noted that exactly k spare nodes are added to obtain a fault tolerant mesh capable of sustaining up to k faults. This approach to constructing a fault tolerant mesh guarantees that any process, system, etc., designed to be supported by the target mesh will operate with no slowdown in the presence of k or fewer node faults, regardless of their distribution.

Fault tolerant meshes constructed in accordance with the teachings of the invention may be fabricated at a minimum cost since their fabrication amounts to constructing a fault tolerant graph with minimum degree (number of edges per node) and a minimum of spare components.

It should also be noted that the teachings of the invention extend to the tolerance of edge faults (as well as node faults) since, as will be explained in greater detail hereinafter, a node incident with a given faulty edge may be treated as the faulty node.

Essential for an understanding of the invention is a familiarity with a family of graphs known as circulant graphs. Such graphs have X nodes in which the edges can be defined by using a set of jumps or offsets. By definition, if the set of m offsets is $\{s_j$ such that $1 \leq j \leq m\}$, then every node (for example, node i), is connected to the nodes $i+s_1, i-s_1, i+s_2, i-s_2, \ldots i+s_m, i-s_m$, (mod X).

According to another aspect of the invention, a fault tolerant network (mesh) $M_k$ can be constructed for any given d-dimensional target mesh M, having $N=n_1 \times n_2 \times \ldots \times n_d$ nodes (with $d \geq 2$ and $n_d \geq 3$), where $M_k$ has $N+k$ nodes and can tolerate up to k faults. $M_k$ constructed in accordance with the teachings of the invention has the property that any N of the nodes in $M_k$ can be reconfigured, without the use of switches, to form the given d-dimensional mesh upon the occurrence of up to k faults.

More particularly, this aspect of the invention relates to a fault tolerant mesh $M_k$ that includes a d-dimensional mesh M having $N=n_1 \times n_2 \times \ldots \times n_d$ identical nodes (with $d \geq 2$ and $n_d \geq 3$), where $M_k$ can sustain up to k faults and can be reconfigured without the use of switches to form mesh M, comprising (a) $N+k$ nodes where the additional k nodes are of the same type as in mesh M, arranged as a circulant graph; and (b) a plurality of edges for the circulant graph where, for k odd, the edges are defined by the union of the following sets of offsets:

$\{1+j$ such that $0 \leq j \leq (k-1)/2\}$;
$\{n_1+j$ such that $0 \leq j \leq (k-1)/2\}$;
$\{(n_1 \times n_2)+j$ such that $0 \leq j \leq (k-1)/2\}$; up to $\{(n_1 \times n_2 \times \ldots \times n_{d-1}) + j$ such that $0 \leq j \leq (k-1)/2\}$; and for k even, the edges are defined by the union of the following sets of offsets:

$\{1 + j$ such that $0 \leq j \leq k/2\}$;
$\{n_1 + j$ such that $0 \leq j \leq k/2\}$;
$\{(n_1 \times n_2) + j$ such that $0 \leq j \leq k/2\}$; up to
$\{(n_1 \times n_2 \times \ldots \times n_{d-1}) + j$ such that $0 \leq j \leq k/2\}$.

A further aspect of the invention is directed to a method for locating the healthy mesh in a fault tolerant mesh $M_k$, in the presence of up to k faults, and reconfiguring $M_k$ to get operable target mesh M. Here, according to the invention, a "renaming" process is used which "relabels" the nodes in $M_k$ to obtain M, given (1) the values of d, $n_1, n_2, \ldots$, nd and k; (2) the structure of the fault tolerant mesh $M_k$ in terms of a circulant graph model; and (3) the locations of the up to k faults in $M_k$. The new labeling, according to one embodiment of the invention, corresponds to a row-major ordering of nonfaulty nodes which yields the healthy mesh.

More particularly, the method for finding healthy mesh M in $M_k$, given a set of up to k faults, where $M_k$ has $N = (n_1 \times n_2 \times \ldots \times n_d) + k$ nodes, with $d \geq 2$ and $n_d \geq 3$, and M has N nodes, comprises the steps of: (a) determining which nonfaulty nodes in $M_k$ are to be considered as candidates for node 0 in the nonfaulty mesh M; (b) determining which of the candidate nonfaulty nodes is to be node 0 in the target mesh; and (c) assigning an identifier to each nonfaulty node, starting with node 0, where the set of identifiers represents a row-major ordering of mesh M.

The invention features the guarantee that a fault tolerant mesh constructed in accordance with the teachings set forth herein will be guaranteed to contain a complete mesh, operable without experiencing slowdown in the presence of up to a predetermined number of faults. The fault tolerant mesh can be constructed at minimum costs (in terms of degree and spare components), and has wide application to parallel computers, WSI arrays, memory chip arrays, etc.

These and other objects and features of the present invention and the manner of obtaining them will become apparent to those skilled in the art, and the invention itself will be best understood by reference to the following detailed description read in conjunction with the accompanying drawing.

DETAILED DESCRIPTION

Figure 1A:
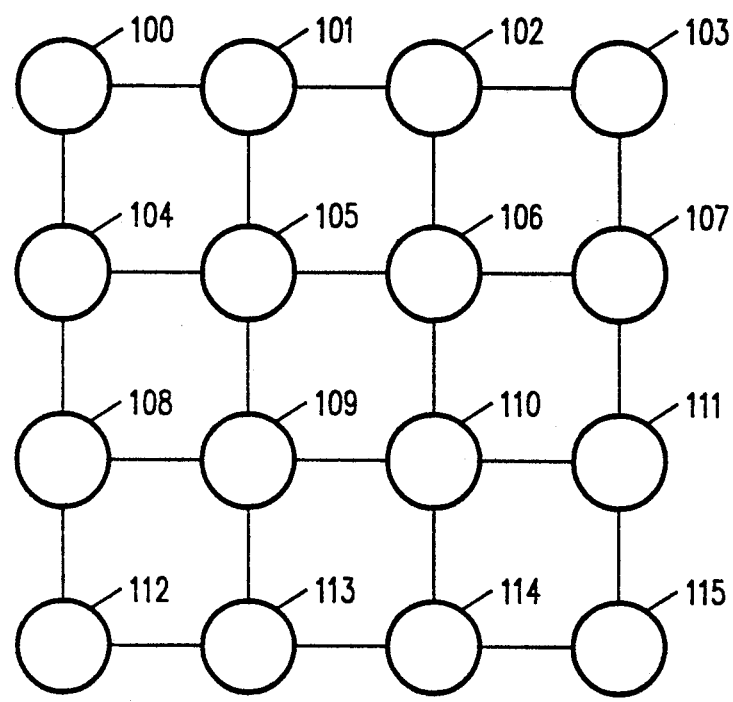
FIG. 1A depicts an example of a prior art 2-dimensional mesh having four rows and four columns (16 nodes).

FIG. 1A depicts an example of a 2-dimensional mesh having four rows and four columns (16 nodes). The nodes are shown labeled as nodes 100-115.

Figure 1B:
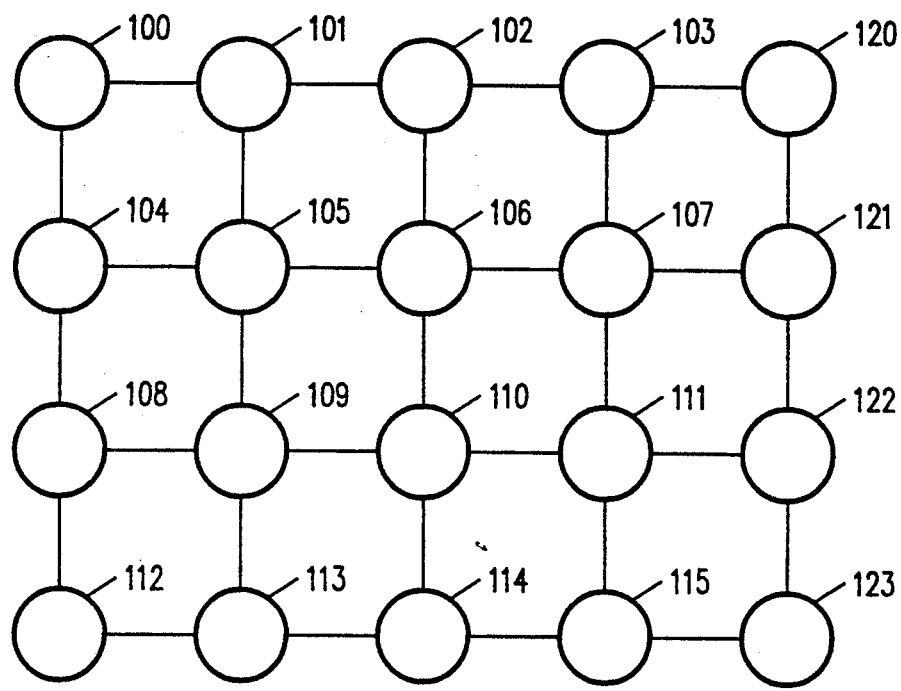
FIG. 1B depicts a prior art technique for modifying the mesh shown in FIG. 1A through the addition of spare components (four extra identical nodes) such that, in certain instances, the modified mesh is fault tolerant.

FIG. 1B shows the addition of four spare nodes 120-123, and connecting links (edges shown as dashed lines) for coupling the spare nodes to the mesh depicted in FIG. 1A. When coupled together, the 20 nodes shown in FIG. 1B form a mesh that is, in certain instances, able to tolerate faults and which exemplifies several of the problems solved by utilizing the invention described herein.

For example, if node 105 (shown in column 2 of FIG. 1B) fails, one prior art approach for achieving fault tolerance would be to rename the columns shown in FIG. 1B such that columns 1, 3, 4, and 5 of FIG. 1B take the place of original columns 1, 2, 3, and 4 shown in FIG. 1A.

The assumption for this scheme to work is that communications can be sustained between columns 1 and 3 in FIG. 1B via the column removed from the FIG. 1B mesh, including communications through faulty node 105. Since this assumption is not always correct, the FIG. 1B mesh may not truly be fault tolerant. Furthermore, it can be seen that the cost of replacing a column containing a faulty node for this simple example requires four spare nodes (120-123) in an application that may only require that a single fault be tolerated.

Not depicted are other prior art schemes for achieving fault tolerance in a mesh architecture which are further complicated by the introduction of switches, additional edges, etc., which can make even simple meshes costly to operate and degrade performance.

By way of contrast, according to the invention, if a given mesh architecture is represented as a graph where every node in the graph corresponds to a processor/component and every edge is a link between processor/components, faulty nodes can be dealt with by adding spare nodes, and only a minimum number of spare nodes will need to be added. Thus, if k node faults are to be tolerated, only (and exactly) k spares need to be added to the target mesh to obtain a fault tolerant mesh. When practicing the invention, as will be demonstrated hereinafter, given any set of k node faults, all of the healthy nodes can be configured as a healthy mesh.

More formally, a d-dimensional mesh M can be viewed as a graph with $N = n_1 \times n_2 \times \ldots \times n_d$ nodes, where each $n_i$ specifies the length of the i-th dimension. Each node is labeled with a unique vector of the form $(x_1, x_2, \ldots, x_d)$ where $0 \leq x_i < n_i$, for all i, $1 \leq i \leq d$. Each node $(x_1, x_2, \ldots, x_d)$ is connected to at most 2d nodes of the form $(x_1 \ldots x-1, x_i \pm 1, x_{i+1} \ldots x_d)$.

Given a d-dimensional mesh M with N nodes, a mesh $M_k$ with $N+k$ nodes is called a k-FT d-dimensional mesh if every subgraph of the graphical representation of $M_k$ having N nodes contains M as a subgraph. That is, the graph $M_k$ can tolerate any k faults and still be guaranteed to contain a healthy copy of the mesh M.

The invention has two separate parts. The first part is a process for constructing a k-FT d-dimensional mesh $M_k$ for any d-dimensional mesh M where $d \geq 2$ and $n_d \geq 3$. The second part is an efficient process for finding the good mesh which is present in $M_k$ after it has suffered k node faults. This process is referred to hereinafter as a "renaming" process.

It will be understood by those skilled in the art that the aforementioned separate "parts" of the invention may be practiced together (sequentially) or separately. For example, one may be given a fault tolerant mesh constructed in accordance with the teachings herein and practice only the renaming process; one may simply construct fault tolerant meshes utilizing the teachings set forth herein without actually monitoring node faults, practicing the novel methods described herein for locating a healthy mesh, etc. In any event, the invention is meant to encompass the method and apparatus which facilitate the practice of either or both of the fault tolerant mesh construction techniques and healthy mesh location techniques to be set forth hereinafter.

As an overview, the construction portion of the invention contemplates viewing the target mesh M as a graph and constructing (defining) a fault tolerant graph, representing fault tolerant mesh $M_k$, therefrom. The renaming process contemplates the assignment of new logical labels to the healthy nodes of a fault tolerant mesh in the presence of faults.

Before proceeding with the detailed description of the invention, several concepts need to be defined. First, a d-dimensional mesh is said to be labeled in a row-major order if (assuming some order on the dimensions) the nodes are labeled in a lexicographic order according to their location in the mesh. For example, in a 2-dimensional mesh, the location of a node is given by its row and column index. That is, node (i,j) is in row i and column j. The row-major labeling starts at node (0,0), referred to herein as "node 0", and proceeds lexicographically to (0,1), (0,2), (0,3), ..., (1,0), (1,1), etc. For a given mesh such as the one depicted in FIG. 1A, the row-major ordering would proceed with node 100 being labeled 0, node 101 being labeled 1, etc.

Essential for an understanding of the invention is a familiarity with a family of graphs known as circulant graphs. Such graphs have N nodes in which the edges can be defined by using a set of jumps or offsets. By definition, if the set of m offsets is $\{s_j$ such that $1 \leq j \leq m\}$, then every node (for example, node i), is connected to the nodes $i+s_1$, $i-s_1$, $i+s_2$, $i-s_2$, ..., $i+s_m$, $i-s_m$ (mod N).

When constructing a fault tolerant graph (and corresponding fault tolerant mesh), the manner in which a set of offsets is determined depends on whether k is odd or even. This will be explained in greater detail hereinafter.

Figure 2:
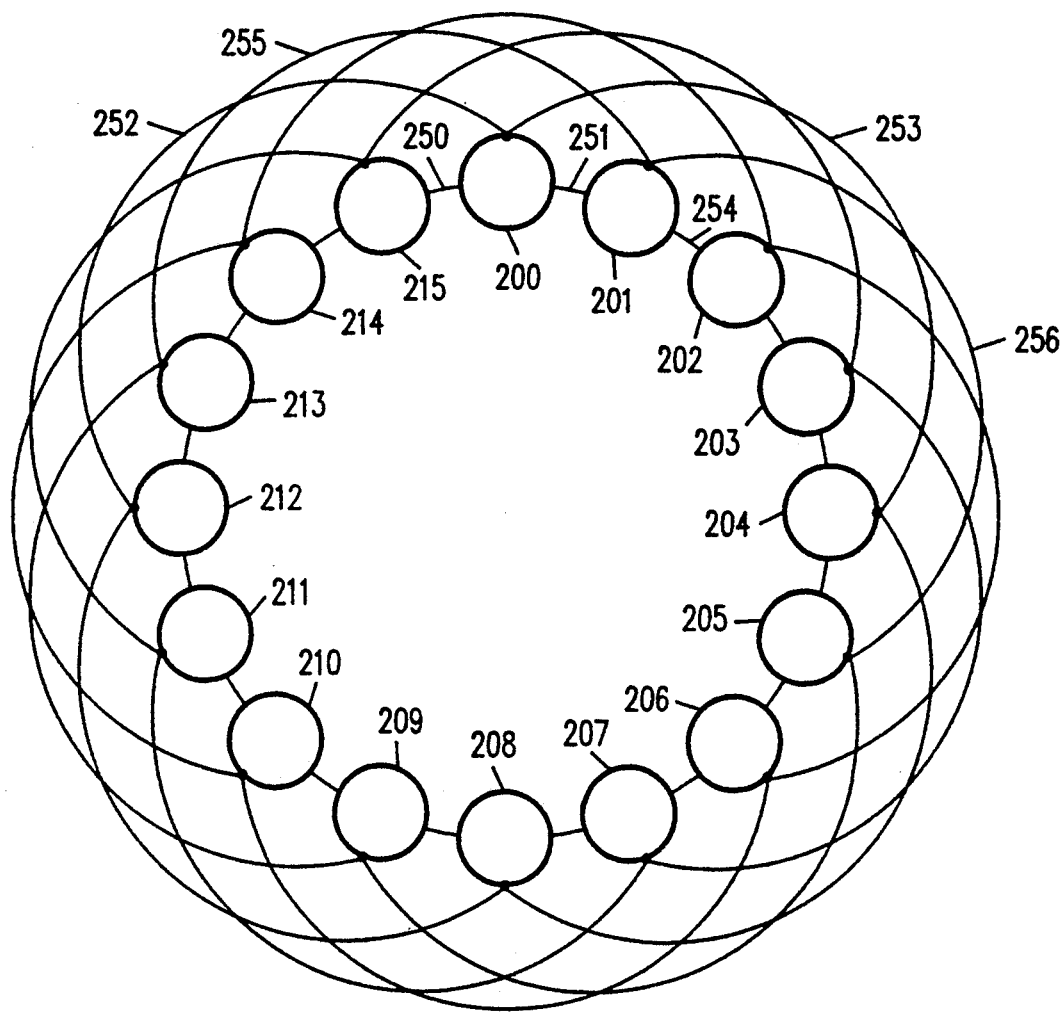
FIG. 2 depicts an example of a circulant graph that corresponds to a 4×4 2-dimensional mesh, such as the mesh depicted in FIG. 1A.

An example of a circulant graph is shown in FIG. 2. The depicted circulant graph has 16 nodes labeled 200-215. These nodes could, for example, correspond to the nodes of the mesh architecture depicted in FIG. 1A. Those skilled in the art will recognize that a few additional edges are shown in the circulant graph depicted in FIG. 2 when compared with the mesh shown in FIG. 1A. For example, node 200 (corresponding to node 100 in FIG. 1A) has four edges vs. the two edges shown for node 100. The circulant graph depicted in FIG. 2 contains the mesh shown in FIG. 1A. Since the mesh depicted in FIG. 1A is a 4×4 2-dimensional mesh, N=16 and the set of m offsets, as will be demonstrated hereinafter, is {1, 4}.

As shown in FIG. 2, the circulant graph corresponding to the mesh depicted in FIG. 1A (although the graph, as indicated above, includes a few more edges) has, in accordance with the aforestated definition, each node connected to its adjacent nodes (i.e., the communication links/edges have an offset of 1), and each node is also connected to nodes having an offset of 4. Thus, for example, node 200 in FIG. 2 is shown coupled to adjacent nodes 215 and 201 via edges 250 and 251, respectively. Also, node 200 is shown coupled via edges 252 and 253 to nodes 212 and 204, respectively. Node 201 is shown coupled via edges 251 and 254 to adjacent nodes 200 and 202, respectively. Node 201 is also shown coupled via edges 255 and 256 to nodes 213 and 205, respectively, etc.

In a modulo N sense (modulo 16 for the illustrative example being set forth herein), each node in FIG. 2 is shown coupled to the nodes $\pm 1$ and $\pm 4$ in both directions (around the circulant graph).

The circulant graph depicted in FIG. 2 is presented for the sake of illustration only. In practice, as indicated hereinbefore, nodes appearing on the "border" of the mesh depicted in FIG. 1A (like node 100) would not require all the edges shown in FIG. 2. Thus, using node 100 as an example again, only two interconnecting links (edges) are required for the mesh to function properly; whereas an "internal" node, like node 105, requires four links (the maximum degree of the mesh).

What is important to note, for the sake of understanding the invention, is that a circulant graph of the type depicted in FIG. 2, constructed from a given mesh and a set of additional spare nodes corresponding in number to the maximum number (k) of faults to be sustained, may serve as a model for fabricating an equivalent mesh which is k fault tolerant.

Circulant graphs are well known to those skilled in the art and are described in detail in an article by Elspas et al. entitled "Graphs with Circulant Adjacency Matrices", appearing in the Journal of Combinatorial Theory, No. 9, pp. 297-307, 1970. The Elspas et al. article is hereby incorporated by reference.

Having laid the foundation for what follows, the details of how to construct a fault tolerant graph, and hence the corresponding fault tolerant mesh, will first be presented in the general application sense, followed by the special case practical example of an n×n 2-dimensional mesh in which it is desirable to sustain a single fault.

According to the invention, if M is a d-dimensional mesh with $N = n_1 \times n_2 \times \ldots \times n_d$ nodes, where $d \geq 2$ and $n_d \geq 3$, and $M_k$ is to be defined as the corresponding k-FT mesh, then $M_k$ consists of N+k nodes that are numbered from 0 to N+k-1; where $M_k$ can be represented as a circulant graph in which the edges are defined as a function of whether k is odd or even (i.e., for the definition of the edges there are two cases).

In case one, k is odd. In this case every node has degree at most d(k+1). The edges are defined by the union of the following sets of offsets:

$\{1+j$ such that $0 \leq j \leq (k-1)/2\}$;
$\{n_1+j$ such that $0 \leq j \leq (k-1)/2\}$;
$\{(n_1 \times n_2)+j$ such that $0 \leq j \leq (k-1)/2\}$; up to
$\{(n_1 \times n_2 \times \ldots \times n_{d-1})+j$ such that $0 \leq j \leq (k-1)/2\}$;

In case two, k is even. In this case every node has degree d(k+2). The edges are defined by the union of the following sets of offsets:

{1+j such that $0 \leq j \leq k/2$};
{$n_1$+j such that $0 \leq j \leq k/2$};
{($n_1 \times n_2$)+j such that $0 \leq j \leq k/2$}; up to
{($n_1 \times n_2 \times \ldots \times n_{d-1}$)+j such that $0 \leq j \leq k/2$}.

A mesh architecture $M_k$ patterned after the above-described circulant graph will be k fault tolerant and therefore be guaranteed to contain mesh M in the presence of up to k faults, regardless of their distribution.

For example, if k=9, d=2, $n_1$=20, and $n_2$=20, then the offsets of the first set are {1,2,3,4,5}. The second set contains the offsets {20,21,22,23,24}. The edges of the resulting 2-dimensional fault tolerant mesh are defined by the union of the d=2 sets of offsets which is the single set containing the edges {1,2,3,4,5,20,21,22,23,24}.

An example of a fault tolerant mesh of practical significance is the very common case of an n×n 2-dimensional mesh. Using the approach described herein, one can construct a k-FT 2-dimensional mesh with degree 2k+2 or 2k+4, for k odd or even, respectively. A particularly interesting and useful subcase is that of a fault tolerant mesh designed to sustain a single fault. The 1-FT 2-dimensional mesh still has maximum degree 4. That is, by adding a single spare node and keeping the degree to be at most 4 (as in the original mesh), one obtains an architecture that can tolerate any single fault.

Formally, in the fault tolerant graph for the exemplary n×n 2-dimensional mesh, there are $N=n^2+1$ nodes. The edges are defined according to the offsets {1,n}. Those skilled in the art will appreciate that this is an extension of a row-major labeling.

Figure 3A:
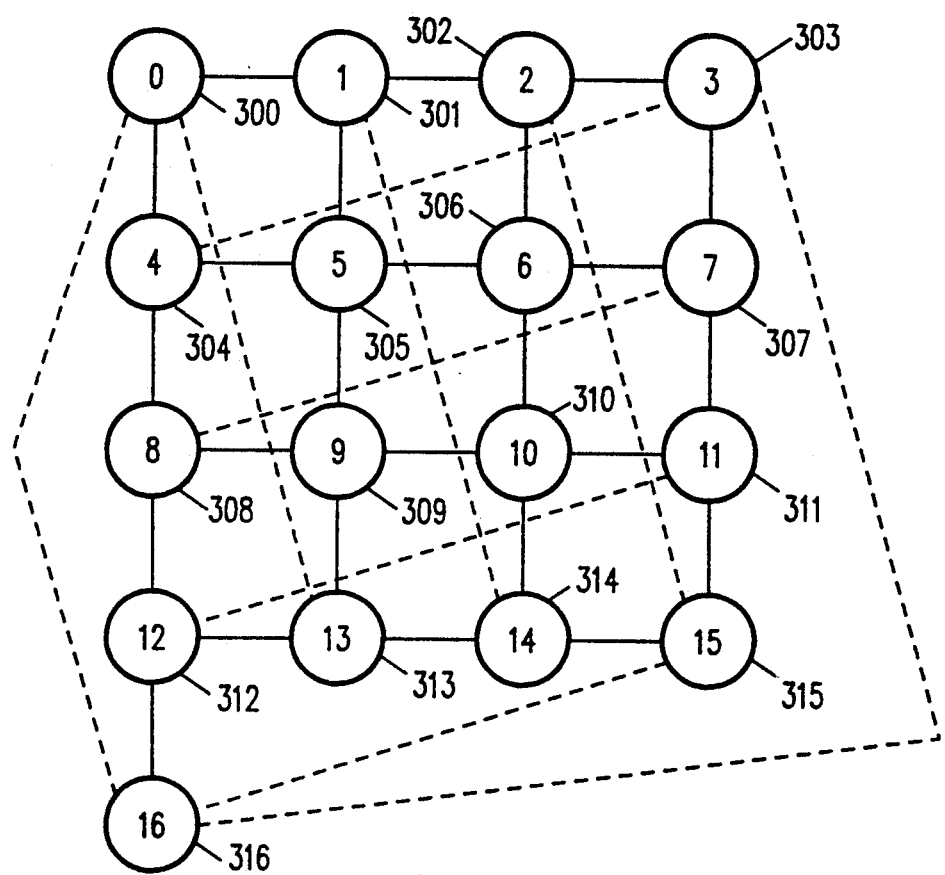
FIG. 3A depicts a k fault tolerant 4×4 mesh instructed in accordance with the teachings of the invention, where k=1.

FIG. 3A depicts an example of a 4×4 1-FT 2-dimensional mesh which is guaranteed to contain the mesh depicted in FIG. 1A (in the presence of up to one fault). The 17 nodes of the mesh depicted in FIG. 3A are labeled 300-316. Their row-major ordered positions in the mesh are shown within the circles representing the nodes, i.e., beginning with node 0, positions 0-16. Nodes 300-316 correspond to nodes 100-115 of FIG. 1A, respectively, with node 316 being the "spare" node in the fault tolerant mesh (not part of the mesh depicted in FIG. 1A).

The edges shown in FIG. 3A by using solid lines correspond to those edges depicted in FIG. 1A. The edges shown as dashed lines (in FIG. 3A) may be used when a fault is sustained and the mesh is reconfigured (relabeled) in accordance with the renaming process to be set forth hereinafter.

Figure 3B:
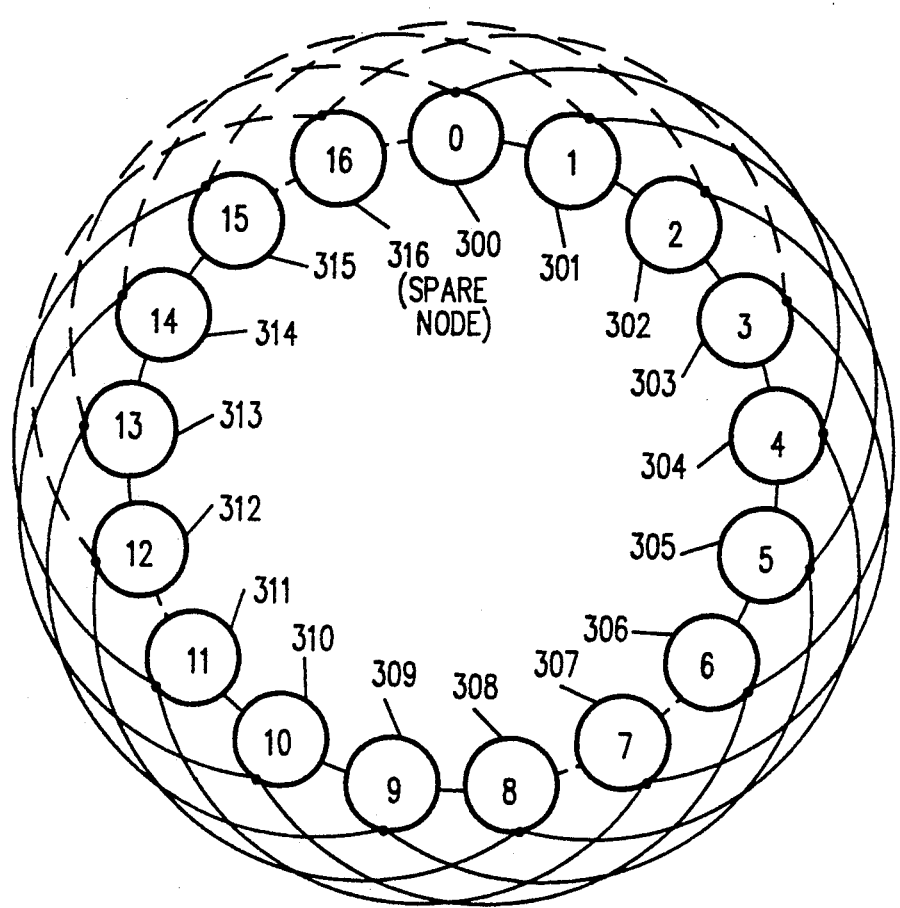
FIG. 3B depicts a circulant graph model from which the fault tolerant mesh depicted in FIG. 3A may be constructed, where the given target mesh used to construct the depicted circulant graph, in accordance with the teachings of the invention, is the mesh shown in FIG. 1A.

The fault tolerant mesh depicted in FIG. 3A (including all depicted edges) corresponds to the circulant graph shown in FIG. 3B, where the offsets used to construct the circulant graph were 1 and 4, and all computations were performed modulo 17 (there are 17 nodes, including the spare node). All reference numerals, nodes, and edges depicted in FIG. 3B correspond to those shown in FIG. 3A.

The inputs for the construction process (e.g., the construction of the graph shown in FIG. 3B as a model for the fault tolerant mesh shown in FIG. 3A) are: (1) the dimension d of the target mesh (d=2 in the case of FIG. 1A); (2) $n_1$, $n_2$, ..., $n_d$ (i.e., the structure of the target mesh itself is an input, e.g., $n_1=n_2=4$ in the case of FIG. 1A); and (3) k, the number of faults to be sustained (k was set equal to 1 for the construction of the fault tolerant graph shown in FIG. 3B).

In summary, according to one aspect of the invention, a fault tolerant mesh $M_k$ that includes a d-dimensional mesh M having $N=n_1 \times n_2 \times \ldots \times n_d$ identical nodes (with d>2 and $n_d \geq 3$), where $M_k$ can sustain up to k faults and can be reconfigured without the use of switches to form mesh M, comprises (a) N+k nodes, where the additional k nodes are of the same type as in mesh M, arranged as a circulant graph; and (b) a plurality of edges for said circulant graph where, for k odd, the edges are defined by the union of the following sets of offsets:

{1+j such that $0 \leq j \leq (k-1)/2$};
{$n_1$+j such that $0 \leq j \leq (k-1)/2$};
{($n_1 \times n_2$)+j such that $0 \leq j \leq (k-1)/2$}; up to
{($n_1 \times n_2 \times \ldots \times n_{d-1}$)+j such that $0 \leq j \leq (k-1)/2$};

and for k even, the edges are defined by the union of the following sets of offsets:

{1+j such that $0 \leq j \leq k/2$};
{$n_1$+j such that $0 \leq j \leq k/2$};
{($n_1 \times n_2 \times \ldots \times n_{d-1}$)+j such that $0 \leq j \leq k/2$}.

Next, a systematic way to relabel a fault tolerant mesh in the presence of faults is presented. The results of this relabeling (renaming) process, given k faults in $M_k$ (the k-FT mesh), is an identification of the healthy target mesh M.

The process identifies (defines) the healthy mesh by assigning new labels to the nodes. This new labeling corresponds to a row-major labeling of a healthy mesh. Those skilled in the art will readily appreciate that all the necessary edges exist to perform this process given a fault tolerant mesh constructed (or provided) in accordance with the teachings of the invention as set forth hereinbefore.

Furthermore, with respect to the renaming process per se, the k nodes in $M_k$ that are faulty are identified and provided as an input to the process. These nodes correspond to the physical components that are faulty in $M_k$. Those skilled in the art will recognize that the techniques presented hereinafter are operative independent of whether the k faults are identified and presented as input for the renaming process in real time or on an offline basis. Methods and apparatus for detecting faulty nodes are well known to those skilled in the art and do not constitute a part of the invention per se.

In cases where there are x faulty nodes where x<k, according to the invention, any k−x healthy nodes are arbitrarily selected and considered to be faulty. It should be recalled that the nodes in a circulant graph (corresponding to $M_k$) can be numbered 0 through N+k−1. Since these nodes are ordered cyclically, nodes N+k−1 and 0 are adjacent. Thus, when the nodes are traversed in ascending order, node 0 follows node N+k−1 and when they are traversed in descending order, node N+k−1 follows node 0.

In the following description, let $j=n_1 \times n_2 \times \ldots \times n_{d-1}$ be the value of the largest offset. The renaming process contemplated by the invention must include the three steps (or equivalent variants thereof) as set forth hereinafter. By "equivalent variants" it is meant that where the illustrative embodiment of the invention refers, for example, to "counters", any means for keeping track of the values being counted may be substituted for physical counters per se; where all "counters" are "incremented", equivalent results may be obtained where all counters are instead decremented, etc. The specific terms used in the following description of the renaming process are presented for the sake of illustration only and are not intended to limit the scope of the invention which will be defined hereinafter in the claims.

The first step in the aforementioned three-step process utilizes two counters: one to count faulty nodes and one to count nonfaulty nodes. According to the first process step, the routine described hereinafter is performed for all values of i where $0 \leq i \leq N+k-1$.

First, both counters are cleared (for example, set to 0). Next, according to one embodiment of the invention, the nodes are visited in a descending order starting with node i. As each node is visited, the appropriate counter is incremented. That is, if the visited node is faulty, the counter for faulty nodes is incremented, and if the visited node is nonfaulty, the counter for nonfaulty nodes is incremented.

The counter for nonfaulty nodes is checked after it is incremented. If this counter is greater than j (recalling that $j = n_1 \times n_2 \times \ldots \times n_{d-1}$), the process of visiting the nodes in descending order is terminated and the counter for faulty nodes is checked. If the counter for faulty nodes is greater than k/2, node i is designated as being "marked"; while if it is less than or equal to k/2, node i is designated as being "unmarked". Each nonfaulty "marked" node is a candidate for node 0 of the target mesh.

The second step of the process determines which of the candidate nonfaulty nodes should play the role of node 0 in the nonfaulty mesh. The second step uses a single counter and it consists of two phases.

Phase 1 begins, according to a preferred embodiment of the invention, by setting the counter to 0. Then the nodes are visited in descending order, starting with any arbitrarily selected node.

As each node is visited, the node is checked to see whether or not it is faulty and whether or not it is marked. If the node is nonfaulty and unmarked, the counter is incremented. If the node is nonfaulty and marked, the counter is reset to 0. If the node is faulty, the counter is left unchanged.

Next, the counter is checked and Phase 1 is terminated if the counter is greater than or equal to N/2. The node that is being visited when the counter reaches N/2, according to the preferred embodiment of the invention, is called node a.

In Phase 2, the nodes are visited in ascending order beginning with node a. Phase 2 terminates when a nonfaulty node which is marked is encountered. According to the invention, this nonfaulty marked node is designated as node b.

The third step of the renaming process assigns numbers (identifiers) to the nonfaulty nodes. The nodes are visited in ascending order, starting with node b, and the nonfaulty nodes are assigned the values $0, 1, \ldots, N-1$ in order. Thus node b is assigned 0, the next nonfaulty node which is visited is assigned 1, and the last nonfaulty node that is visited is assigned $N-1$. These numbers correspond to the row-major labels of a nonfaulty mesh.

Again, it should be noted that in the case of a single fault the above process will result in a new labeling that starts immediately after the fault. For example, with reference to FIG. 4, consider the 4×4 1-FT mesh in FIG. 3A and assume that node 305 is faulty.

Figure 4:
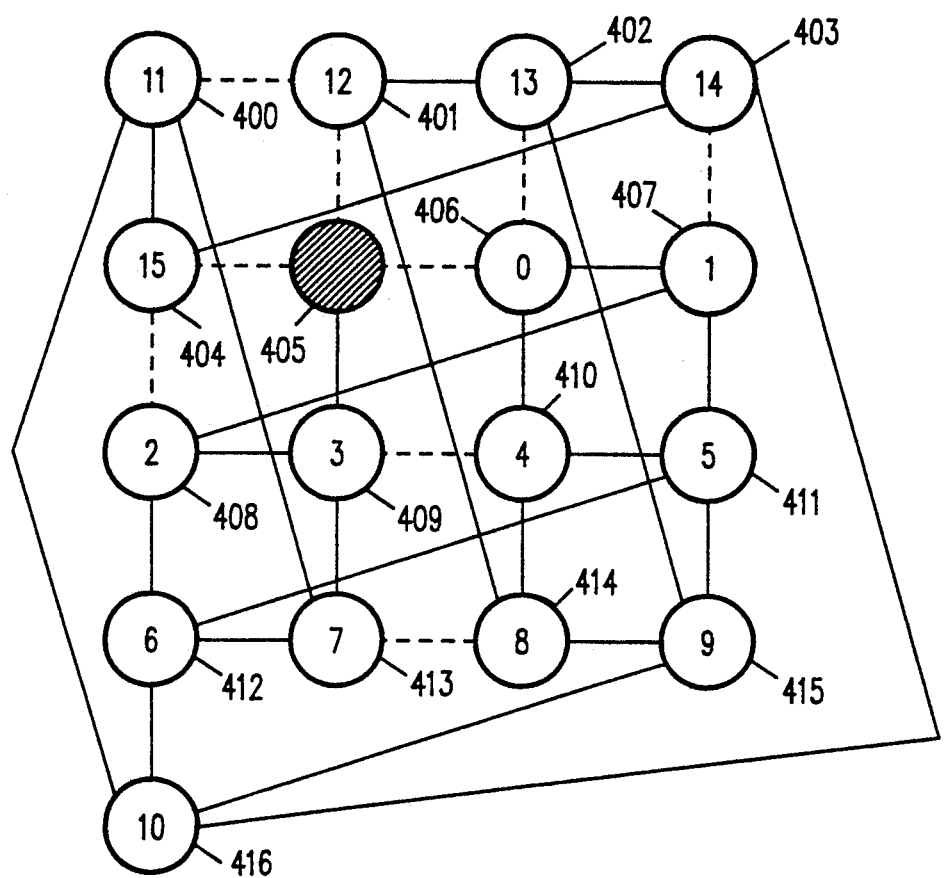
FIG. 4 depicts a reconfigured version of the fault tolerant mesh depicted in FIG. 3A (after the occurrence of a single fault), where the reconfiguration has been performed without the use of switches and in accordance with the renaming process portion of the invention.

FIG. 4 presents the new labeling of the mesh after performance of the above-described renaming process. The operative edges of the new mesh are shown in solid lines; edges no longer used after "cutting out" the faulty node (designated as a blackened circle in FIG. 4) are shown as dashed lines.

In FIG. 4 it can be seen that node 405 corresponding in position to node 305 in FIG. 3A) is cut out without the use of switches or extra nodes (beyond the one spare node required in accordance with the teachings of the invention) when k equals 1. Also, as a result of the relabeling process, it should be noted that node 406 now takes the row-major ordered place of node 300 in the mesh depicted in FIG. 3A (i.e., as node 0). It should also be noted that node 406 in the reconfigured mesh, like node 300 in the original mesh, still has only two edges.

The above-described techniques for achieving fault tolerance in meshes can be implemented in a completely straightforward manner, particularly for small values of k. For example, in the case of a single fault ($k=1$), the maximum degree of a 1-FT mesh is 2d, which is the same as the original mesh. Hence, the fault tolerant mesh can be implemented without changing the specifications of the nodes (no additional connections to or from a given node will be required). For higher values of k, it is possible to use a switching mechanism to take care of the increase in the degree. Again, for small values of k, it is a very practical and efficient approach.

Figure 5:
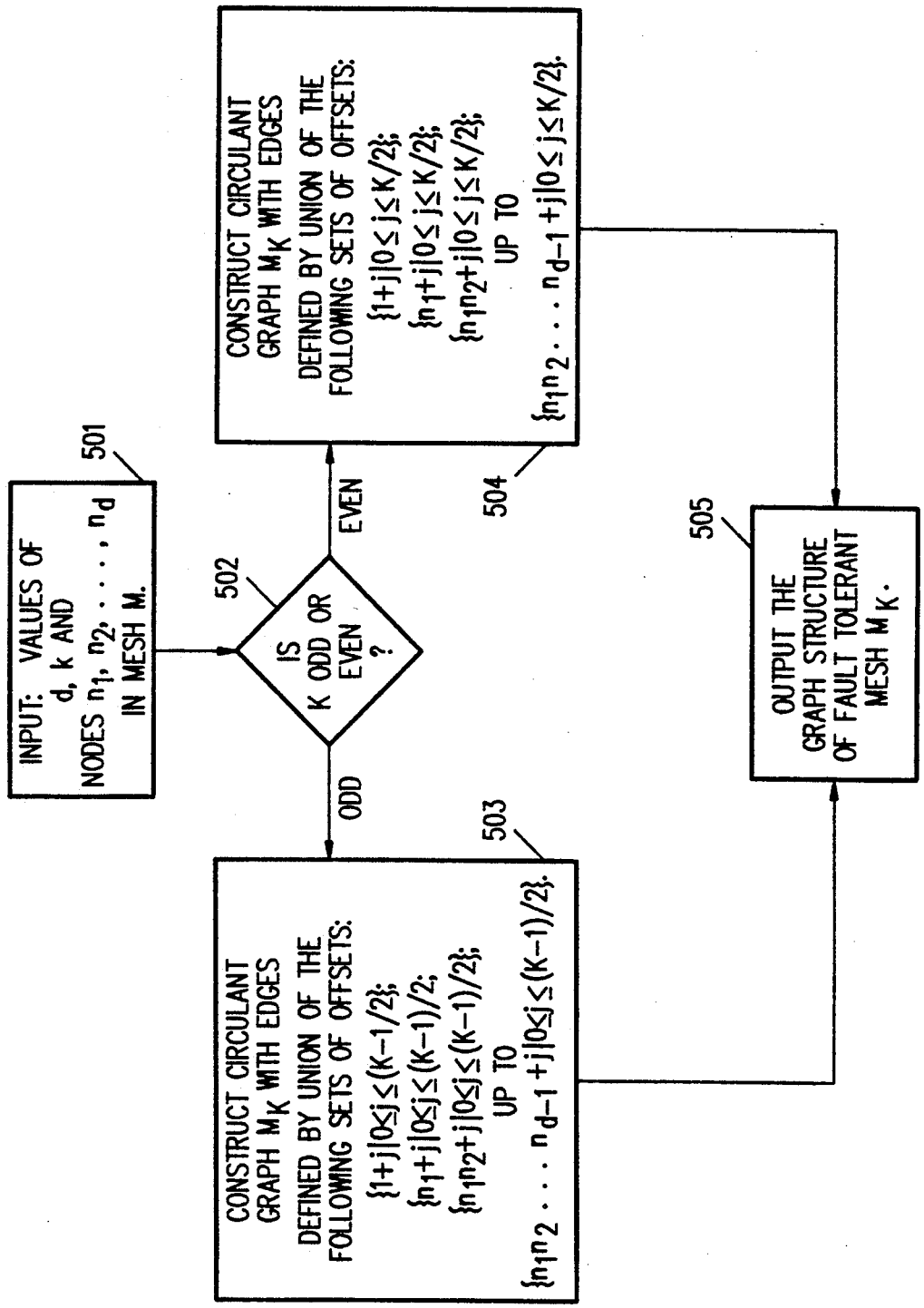
FIG. 5 is a flowchart representation of the process for constructing a k fault tolerant mesh $M_k$ for any given d-dimensional target mesh M having N nodes, where $N = n_1 \times n_2 \times \ldots \times n_d$, and $d \geq 2$ and $n_d \geq 3$.

Reference should now be made to FIG. 5 which is a flowchart representation of the process for constructing a k fault tolerant mesh $M_k$ for any given d-dimensional target mesh M having N nodes, where $N = n_1 \times n_2 \times \ldots \times n_d$, with $d \geq 2$ and $n_d \geq 3$.

Block 501 in FIG. 5 shows the inputs required for the construction process contemplated by the invention. The particular values indicated have already been described hereinabove in detail.

Blocks 502–504 represent the previously described steps of forming a circulant graph where the graph has $(n_1 \times n_2 \times \ldots \times n_d) + k$ nodes, and where the offsets of the graph depend on the value of k (odd or even).

Block 505 represents the output fault tolerant mesh, i.e., the k fault tolerant mesh $M_k$ which can be fabricated in accordance with the graph model constructed at 503 or 504, as appropriate.

Figure 6:
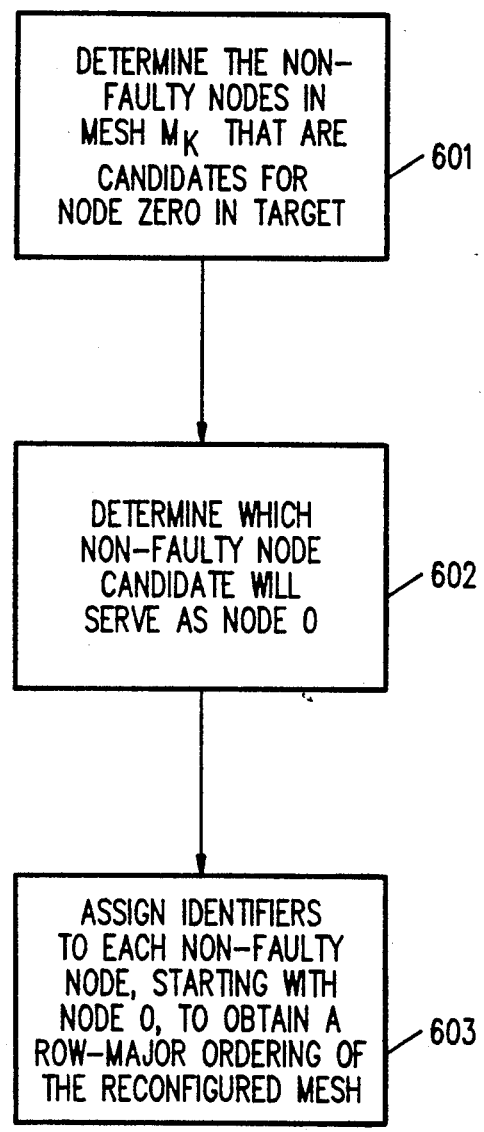
FIG. 6 is a flowchart representation of the process for relabeling a k fault tolerant mesh $M_k$, in the presence of up to k faults, to locate target mesh M.

Reference should be made to FIG. 6 which is a flowchart representation of the process for relabeling a k fault tolerant mesh $M_k$ in the presence of up to k faults to locate target mesh M.

Block 601 represents the step of determining whether each nonfaulty node is marked or unmarked when the nodes in the circulant graph are visited in a predefined order. This step effectively identifies candidates for node 0 in the target mesh.

Block 602 represents the step of determining which nonfaulty marked node is to play the role of node 0 in the target mesh.

Block 603 represents the final step in the novel remaining process, i.e., the step of assigning an identifier to each nonfaulty node starting from node 0, where the set of identifiers represent a row-major ordering of the reconfigured mesh.

What has been described are a method and apparatus for tolerating faults in mesh architectures meeting all of the objectives set forth hereinbefore. Those skilled in the art will recognize that the foregoing description has been presented for the purposes of illustration and description only. It is not intended to be exhaustive or to limit the invention to the precise form disclosed, and obviously many modifications and variations are possible in light of the above teaching. The embodiments and examples set forth herein were presented in order to best explain the principles of the instant invention and its practical application to thereby enable others skilled in the art to best utilize the instant invention in various embodiments and various modifications as are suited to the particular use contemplated.

What is claimed is:

1. A fault tolerant mesh $M_k$ that includes a d-dimensional mesh M having $N = n_1 \times n_2 \times \ldots \times n_d$ identical nodes, where each $n_i$ specifies the length of the i-th dimension, with $d \geq 2$ and $n_d \geq 3$, where $M_k$ can sustain up to k faults and be reconfigured without switches to form mesh M, comprising: (a) N+k nodes, where the additional k nodes are of the same type as in mesh M, arranged in the form of a circulant graph; and (b) a plurality of edges for said circulant graph where, for k odd, the edges are defined by the union of the following sets of offsets:

$\{1+j$ such that $0 \leq j \leq (k-1)/2\}$;
$\{n_1+j$ such that $0 \leq j \leq (k-1)/2\}$;
$\{(n_1 \times n_2)+j$ such that $0 \leq j \leq (k-1)/2\}$; up to
$\{(n_1 \times n_2 \ldots \times n_{d-1})+j$ such that
$0 \leq j \leq (k-1)/2\}$; and for k even, the edges are defined by the union of the following sets of offsets;

$\{1+j$ such that $0 \leq j \leq k/2\}$;
$\{n_1+j$ such that $0 \leq j \leq k/2\}$;
$\{(n_1 \times n_2)+j$ such that $0 \leq j \leq k/2\}$; up to
$\{(n_1 \times n_2 \ldots \times n_{d-1})+j$ such that $0 \leq j \leq k/2\}$.

2. Apparatus as set forth in claim 1, wherein the maximum degree of the circulant graph and corresponding mesh $M_k$ is $d(k+1)$ when k is odd and $d(k+2)$ when k is even.

3. Apparatus as set forth in claim 1, wherein fault tolerant mesh $M_k$, for $k=1$, has the same degree as mesh M.

4. A method of constructing a k fault tolerant mesh $M_k$ that includes a d-dimensional mesh M having $N = n_1 \times n_2 \times \ldots \times n_d$ identical nodes, where each $n_i$ specifies the length of the i-th dimension, with $d \geq 2$ and $n_d \geq 3$, where $M_k$ can sustain up to k faults and be reconfigured without switches to form mesh M, comprising the steps of:

(a) arranging the N nodes of mesh M and exactly k additional nodes, where the additional k nodes are of the same type as in mesh M, in the form of a circulant graph;

(b) defining the edges of said circulant graph, for k odd, by the union of the following sets of offsets:

$\{1+j$ such that $0 \leq j \leq (k-1)/2\}$;
$\{n_1+j$ such that $0 \leq j \leq (k-1)/2\}$;
$\{(n_1 \times n_2)+j$ such that $0 \leq j \leq (k-1)/2\}$; up to
$\{(n_1 \times n_2 \ldots \times n_{d-1})+j$ such that
$0 \leq j \leq (k-1)/2\}$; and (c) defining the edges of said circulant graph, for k even, by the union of the following sets of offsets:

$\{1+j$ such that $0 \leq j \leq k/2\}$;
$\{n_1+j$ such that $0 \leq j \leq k/2\}$;
$\{(n_1 \times n_2)+j$ such that $0 \leq j \leq k/2\}$; up to
$\{(n_1 \times n_2 \ldots \times n_{d-1})+j$ such that $0 \leq j \leq k/2\}$.

5. A method for fabricating a d-dimensional k fault tolerant mesh $M_k$ from a given target mesh M which can be any d-dimensional mesh with $N = n_1 \times n_2 \times \ldots \times n_d$ nodes, where each $n_i$ specifies the length of the i-th dimension, and $d \geq 2$ and $n_d \geq 3$, comprising the steps of:

(a) determining the dimension d of target mesh M;

(b) identifying the structure of target mesh M by inputting the values of $n_1, n_2, \ldots, n_d$;

(c) inputting k, the number of faults to be sustained by the fault tolerant mesh $M_k$ being constructed;

(d) defining a circulant graph having exactly N+k nodes;

(e) defining the edges of said circulant graph, for k odd, by the union of the following sets of offsets;

$\{1+j$ such that $0 \leq j \leq (k-1)/2\}$;
$\{n_1+j$ such that $0 \leq j \leq (k-1)/2\}$;
$\{(n_1 \times n_2)+j$ such that $0 \leq j \leq (k-1)/2\}$; up to
$\{(n_1 \times n_2 \ldots \times n_{d-1})+j$ such that
$0 \leq j \leq (k-1)/2\}$;

(f) defining the edges of said circulant graph for k even, by the union of the following sets of offsets:

$\{1+j$ such that $0 \leq j \leq k/2\}$;
$\{n_1+j$ such that $0 \leq j \leq k/2\}$;
$\{(n_1 \times n_2)+j$ such that $0 \leq j \leq k/2\}$; up to
$\{(n_1 \times n_2 \ldots \times n_{d-1})+j$ such that
$0 \leq j \leq k/2\}$; and (g) constructing the mesh that corresponds to said circulant graph to form the d-dimensional k fault tolerant mesh $M_k$.

6. A method for locating a healthy target mesh M in a fault tolerant mesh $M_k$, in the presence of up to k faults, and reconfiguring $M_k$ to obtain M, given (1) the dimension d of M, (2) the value of k, (3) the values of $n_1, n_2, \ldots, n_d$, where each $n_i$ is the length of a side in the d-dimensional mesh M, and $d \geq 2$ and $n_2 \geq 3$, where x is the number of faulty nodes, (4) the structure of the fault tolerant mesh $M_k$ in terms of a circulant graph model, and (5) the locations of the up to k faults in $M_k$, comprising the steps of:

(a) determining if the number of faults sustained in $M_k$ is less than k;

(b) choosing k−x nonfaulty nodes and designating the k−x nodes as faulty if $x < k$, for a total of k faulty nodes;

(c) identifying node 0 in the target mesh M from among the nonfaulty nodes remaining in $M_k$; and (d) relabeling the nodes in $M_k$ to obtain healthy mesh M using a row-major ordering starting at node 0.

7. A method for finding healthy mesh M in a fault tolerant mesh $M_k$, given a set of up to k faults, where $M_k$ has $N+k = (n_1 \times n_2 \ldots \times n_d) + k$ nodes, where each $n_i$ specifies the length of the i-th dimension, where $d \geq 2$ and $n_d \geq 3$, and M has N nodes, comprising the steps of:

(a) determining which nonfaulty nodes in $M_k$ are to be considered as candidates for node 0 in mesh M;

(b) determining which of the candidate nonfaulty nodes is to be node 0 in the target mesh; and (c) assigning an identifier to each nonfaulty node, starting with node 0, where the set of identifiers represents a row-major ordering of mesh M.

8. A process for locating a target d-dimensional mesh M having N nodes, where $N = n_1 \times n_2 \times \ldots \times n_d$, where each $n_i$ specifies the length of the i-th dimension, and $d \geq 2$ and $n_d \geq 3$ in a k fault tolerant mesh $M_k$ that has sustained up to k faults, where $M_k$ can be represented by a circulant graph model, and where the largest offset in said graph is $j = n_1 \times n_2 \times \ldots \times n_{d-1}$, comprising the steps of:

(a) inputting the identification of each faulty and nonfaulty node in $M_k$ and the circulant graph representation thereof;

(b) counting the number of faulty nodes and nonfaulty nodes in $M_k$ for all nodes i in $M_k$, where $0 \leq i \leq N+k-1$, by visiting each node, starting a node i, proceeding in a first preselected direction around the circulant graph;

(c) checking the nonfaulty node count after each nonfaulty node is detected and determining if the nonfaulty node count is greater than j;

(d) terminating the visitation of nodes in said first preselected direction if the nonfaulty node count is greater than j;

(e) determining, after said step of terminating, if the number of faulty nodes is greater than k/2 and if so, designating node i as a marked node, otherwise designating node i as unmarked; and (f) reiterating the aforestated process for each node i in mesh $M_k$ for $0 \leq i \leq N+k-1$.

9. A method as set forth in claim 8, wherein each nonfaulty marked node is a candidate for node 0 in target mesh M.

10. A method as set forth in claim 9, further comprising the step of determining which nonfaulty marked node is to be designated as node 0 in target mesh M.

11. A method as set forth in claim 10, wherein said step of determining which nonfaulty marked node is to be designated as node 0 in target mesh M further comprises the steps of:

(a) visiting the nodes of said circulant graph, starting with an arbitrary node, in a second preselected direction;

(b) counting, as each node is visited, the number of nonfaulty unmarked nodes, resetting the count whenever a nonfaulty marked node is visited;

(c) terminating the step of visiting when the number of nonfaulty unmarked nodes is greater than or equal to N/2, and designating the node being visited at the time of termination as the starting node of a second visitation process;

(d) visiting the nodes of said circulant graph in a second visitation process, beginning with said starting node, in the opposite direction of said second preselected direction, and terminating said second visitation process when a nonfaulty node which is marked is encountered; and (e) designating the encountered nonfaulty marked node as node 0 of target mesh M.

12. A method as set forth in claim 11, further comprising the step of assigning node identifiers to each nonfaulty node.

13. A method as set forth in claim 11, wherein said step of assigning node identifiers to each nonfaulty node further comprises the steps of:

(a) visiting the nodes of said circulant graph in an ascending order, starting with node 0; and (b) assigning the nodes visited after node 0, in order, the values 1, 2, . . . , N−1, creating a row-major ordering of the nonfaulty mesh.

14. A method as set forth in claim 13, further comprising the steps of:

(a) determining if the number of faults sustained in $M_k$ is less than k; and (b) choosing k−x nonfaulty nodes and designating the k−x nodes as faulty if x<k, for a total of k faulty nodes, where x is the number of faulty nodes.

15. A method of constructing a k fault tolerant mesh $M_k$ that includes a d-dimensional mesh M having $N = n_1 \times n_2 \times \ldots \times n_d$ identical nodes, where each $n_i$ specifies the length of the i-th dimension, with $d \geq 2$ and $n_d \geq 3$, where $M_k$ can sustain up to k faults and be reconfigured without switches to form mesh M, and locating M in $M_k$ when up to k faults are sustained by $M_k$, comprising the steps of:

(a) arranging the N nodes of mesh M and exactly k additional nodes, where the additional k nodes are of the same type as in mesh M, in the form of a circulant graph;

(b) defining the edges of said circulant graph for k odd, by the union of the following sets of offsets:
$\{1+j$ such that $0 \leq j \leq (k-1)/2\}$;
$\{n_1+j$ such that $0 \leq j \leq (k-1)/2\}$;
$\{(n_1 \times n_2)+j$ such that $0 \leq j \leq (k-1)/2\}$; up to
$\{(n_1 \times n_2 \times \ldots \times n_{d-1})+j$ such that $0 \leq j \leq (k-1)/2\}$;

(c) defining the edges of said circulant graph for k even, by the union of the following sets of offsets:
$\{1+j$ such that $0 \leq j \leq k/2\}$;
$\{n_1+j$ such that $0 \leq j \leq k/2\}$;
$\{(n_1 \times n_2)+j$ such that $0 \leq j \leq k/2\}$; up to
$\{(n_1 \times n_2 \times \ldots \times n_{d-1})+j$ such that $0 \leq j \leq k/2\}$;

(d) determining which nonfaulty nodes in $M_k$ are to be considered as candidates for node 0 in mesh M whenever $M_k$ sustains up to k faults;

(e) determining which of the candidates nonfaulty nodes is to be node 0 in target mesh M; and (f) assigning an identifier to each nonfaulty node, starting with node 0, where the set of identifiers represents a row-major ordering of mesh M.

16. A method as set forth in claim 15, wherein the maximum degree of the circulant graph and corresponding mesh $M_k$ is $d(k+1)$ when k is odd and $d(k+2)$ when k is even.

17. A method as set forth in claim 15, wherein fault tolerant mesh $M_k$, for k=1, has the same degree as mesh M.

18. Apparatus for identifying a health mesh M in a fault tolerant mesh $M_k$, given a set of up to k faults, where $M_k$ has $N+k=(n_1 \times n_2 \times \ldots \times n_d)+k$ nodes, where each $n_i$ specifies the length of the i-th dimension, with $d \geq 2$ and $n_d \geq 3$, and M has N nodes, comprising:

(a) means for identifying which nonfault nodes in $M_k$ are to be considered as candidates for node 0 in mesh M;

(b) means for determining which of the candidate nonfaulty nodes is to be node 0 in target mesh M, wherein said means for determining is responsive to input from said means for identifying; and (c) reconfiguration means for assigning an identifier to each nonfaulty node in mesh $M_k$, starting with node 0, as identified by said means for determining, where the set of identifiers represents a row-major order of mesh M.

19. Apparatus as set forth in claim 18, wherein said $M_k$, in the presence of up to k faults, may be reconfigured into healthy target mesh M without the use of switches.

* * * * *